(12) United States Patent
Jung et al.

(10) Patent No.: US 10,935,020 B2
(45) Date of Patent: Mar. 2, 2021

(54) APPARATUS FOR CONTROLLING LINEAR COMPRESSOR

(71) Applicant: LG ELECTRONICS INC., Seoul (KR)

(72) Inventors: Kyunghoon Jung, Seoul (KR); Gyunam Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 15/874,116

(22) Filed: Jan. 18, 2018

(65) Prior Publication Data

US 2018/0202430 A1 Jul. 19, 2018

(30) Foreign Application Priority Data

Jan. 18, 2017 (KR) ........................ 10-2017-0008886

(51) Int. Cl.
*F04B 49/06* (2006.01)
*F04B 35/04* (2006.01)
(Continued)

(52) U.S. Cl.
CPC ............ *F04B 49/06* (2013.01); *F04B 35/045* (2013.01); *F04B 49/065* (2013.01); *H02K 33/02* (2013.01);
(Continued)

(58) Field of Classification Search
CPC ........ F04B 49/06; F04B 49/065; F04B 49/12; F04B 51/00; F04B 2203/0401; F04B 2203/0402; F04B 35/045; H02P 1/00; H02P 1/04; H02P 1/24; H02P 1/26; H02P 1/42; H02P 1/46; H02P 3/00; H02P 8/00; H02P 21/00; H02P 23/00; H02P 25/00;
(Continued)

(56) References Cited

U.S. PATENT DOCUMENTS 4,871,952 A * 10/1989 Ishizaka .................... H02P 7/29
388/829
9,518,578 B2 12/2016 Dainez et al.
(Continued)

FOREIGN PATENT DOCUMENTS

CN 101533071 9/2009
CN 104579092 4/2015
(Continued)

OTHER PUBLICATIONS

PCT International Search Report and Written Opinion dated Feb. 23, 2018 issued in Application No. PCT /KR2017 /013597.
(Continued)

*Primary Examiner* — Bryan M Lettman
(74) *Attorney, Agent, or Firm* — Ked & Associates, LLP

(57) ABSTRACT

An apparatus for linear compressor includes a drive unit configured to apply a test signal to the linear compressor, a current detection unit configured to detect a motor current of the linear compressor, a voltage detection unit configured to detect a motor voltage of the linear compressor, and a controller configured to acquire plural inductances varied according to a size of the motor current, based on a change of the motor current and the motor voltage which are acquired according as the test signal is applied.

12 Claims, 7 Drawing Sheets

(51) Int. Cl.
  *H02K 33/02* (2006.01)
  *H02K 33/00* (2006.01)
(52) U.S. Cl.
  CPC ............... *F04B 2203/0401* (2013.01); *F04B 2203/0402* (2013.01); *H02K 33/00* (2013.01)
(58) Field of Classification Search
  CPC .......... H02P 27/04; H02P 27/06; H02P 27/08; H02P 6/006; H02P 8/005; H02P 25/06; G05B 11/28; H02K 33/00; H02K 33/02
  See application file for complete search history.

(56) References Cited

U.S. PATENT DOCUMENTS

| | | | | |
|---|---|---|---|---|
| 2008/0294098 | A1* | 11/2008 | Sarkinen | F04B 49/06 604/67 |
| 2012/0313561 | A1* | 12/2012 | Okamoto | H02P 29/0241 318/139 |
| 2015/0226195 | A1 | 8/2015 | Mallampalli et al. | |
| 2016/0090975 | A1 | 3/2016 | Kim et al. | |
| 2017/0373629 | A1* | 12/2017 | Shin | H02P 21/22 |

FOREIGN PATENT DOCUMENTS

| | | | |
|---|---|---|---|
| JP | 2008-259409 | | 10/2008 |
| KR | 10-2011-0097060 | | 8/2011 |
| KR | 10-2013-0090319 | | 8/2013 |
| KR | 10-2016-0037618 | | 4/2016 |
| WO | WO2016111508 | * | 7/2006 |

OTHER PUBLICATIONS

Chinese Office Action (with English translation) dated Mar. 11, 2020 issued in CN Application No. 201780083890.9.

* cited by examiner

APPARATUS FOR CONTROLLING LINEAR COMPRESSOR

CROSS-REFERENCE TO RELATED APPLICATION

This application claims priority under 35 U.S.C. § 119 to Korean Application No. 10-2017-0008886, filed on Jan. 18, 2017, whose entire disclosure is hereby incorporated by reference.

BACKGROUND

1. Field

This specification relates to an apparatus for controlling a linear compressor which acquires inductances by sizes of electric currents by applying a test signal.

2. Background

A compressor is an apparatus that may convert mechanical energy into compression energy to reduce a volume of a compressible fluid. A compressor may be included, for example, as a component of a heating/cooling cycle of refrigeration equipment, such as a refrigerator or an air conditioner. For example, the compressor may receive and compress a gaseous refrigerant into a relatively warmer liquid form.

Compressors may be classified, for example, as a reciprocating (or piston) compressor, a rotary (or rolling piston) compressor, or a scroll compressor, but it should be appreciated that other types of compressors are known and may be used. The reciprocating compressor has a compression space between a piston and a cylinder, and the piston compresses a fluid received in the compression space while linearly reciprocating within the cylinder. The rotary compressor has a compression space within a cylinder, and a roller within the cylinder compresses a fluid while eccentrically rotating along an inner wall of the cylinder. The scroll compressor has a compression space between an orbiting scroll and a fixed scroll, and the orbiting scroll compresses a fluid while rotating along the fixed scroll.

As previously described, the reciprocating compressor includes a piston that compresses a fluid received in a compression space while linearly reciprocating within the cylinder. Additionally, the piston may selectively suction a fluid into the cylinder or exhaust a fluid from the cylinder while linearly reciprocating within the cylinder.

The reciprocating compressor may be further classified as a recipro-type (or reciprocating-type) compressor or a linear-type compressor. The recipro-type compressor may include a crank shaft that is coupled to a motor that generates a rotating driving force (or torque), and the piston may be coupled to the crank shaft such that the rotating driving force of the motor is converted into a linear reciprocating motion for the piston. In contrast, the linear-type compression may include a piston that is connected to a mover of a motor that moves linearly such that a piston is reciprocated by a linear motion of the motor.

A reciprocating compressor may include a motor unit that generates a drive force and a compression unit that compresses a fluid based on receiving the drive force from the motor unit. For the motor unit, a general motor may be used in the recipro-type compressor, or a linear motor may be used in the linear-type compressor. As the linear motor directly generates a linear type drive force, a mechanical conversion device is generally not separately required, and thus the linear motor may have a relatively simple structure. Further, the linear motor may have a reduced energy loss due to an energy conversion, and since it does not include a connection part that may generate a friction and abrasion, noise in the linear motor can also be considerably reduced. Furthermore, when the linear type reciprocating compressor (hereinafter, referred to as a 'linear compressor') is used in a refrigerator or an air conditioner, a compression ratio can be changed by varying a stroke voltage applied to the linear compressor, such that the liner compressor can advantageously be used in a variable control of the freezing capacity.

In the reciprocating compressor and especially in the linear compressor, the piston may reciprocate while not being mechanically restricted within the cylinder. Accordingly, when an excess voltage is applied, the piston may collide with an inner wall of the cylinder, or the piston may not proceed forward due to a large load such that a compression may not be completely performed. For at least these reasons, a control device may be used to control a piston motion with respect to a load change or a voltage change.

A compressor control device may typically perform feedback control by estimating a stroke in a sensor-less method by detecting a voltage and current applied to a motor of a compressor. The type of compressor control device may include a triode for alternating current (or triac) or an inverter that is used to control the compressor.

To estimate a stroke of a linear compressor, one or more motor constants (or motor measurements) may be used. Types of motor constants that may be used to estimate a stroke of a linear compressor may include, for example, a resistance component of a motor, an inductance component of the motor, and/or a reverse electromotive constant of a motor.

For example, Korea Patent Application No. 10-2014-0130430 (filed on Sep. 29, 2014 and published as Korean Patent Publication No. 10-2016-0037618 on Apr. 6, 2016) describes that a type of a motor is determined by calculating a motor constant and, more particularly, based on identifying the motor type based on calculating an inductance component of a motor. The inductance of a motor may be varied by an input current during operation of a linear compressor. However, in a conventional linear compressor, an inductance of a motor is typically calculated based on a representative value that is estimated, such that changes in the inductance during the operation of a linear compressor may not be readily determinable. Accordingly, an operation error may occur when estimating a stroke using an inductance or executing other controls. The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein.

DETAILED DESCRIPTION

The disclosure disclosed in the present description may be applicable to an apparatus for controlling a linear compressor and a method for controlling the same. However, the disclosure disclosed in the present disclosure is not limited thereto, but maybe applicable to a control apparatus, a control method, a motor control apparatus, a motor control method, a failure diagnosis apparatus, a failure diagnosis method, and a test apparatus and method for existing all kinds of compressors to which the technical concept of the present disclosure may be applicable. For example, the embodiments disclosed in the present disclosure may be applicable to a control apparatus and method for a linear compressor which are capable of controlling several types of linear compressors.

Figure 1:
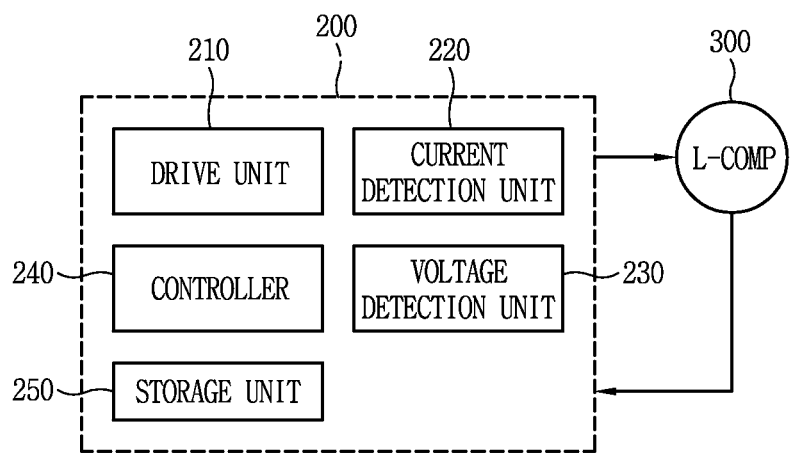
FIG. 1 is a diagram illustrating an apparatus for controlling a linear compressor disclosed in the description.

Hereinafter, description will now be given in detail of a linear compressor according to exemplary embodiments disclosed herein. FIG. 1 is a diagram illustrating a control apparatus (or linear compressor controller) 200 that controls a linear compressor 300 (or 10 in FIG. 10). The control apparatus 200 that controls the linear compressor 300 may include a drive unit (or motor circuit) 210, a current detection unit (or current sensor) 220, a voltage detection unit (a voltage sensor) 230, a controller 240, and a storage unit (or memory) 250.

Figure 2:
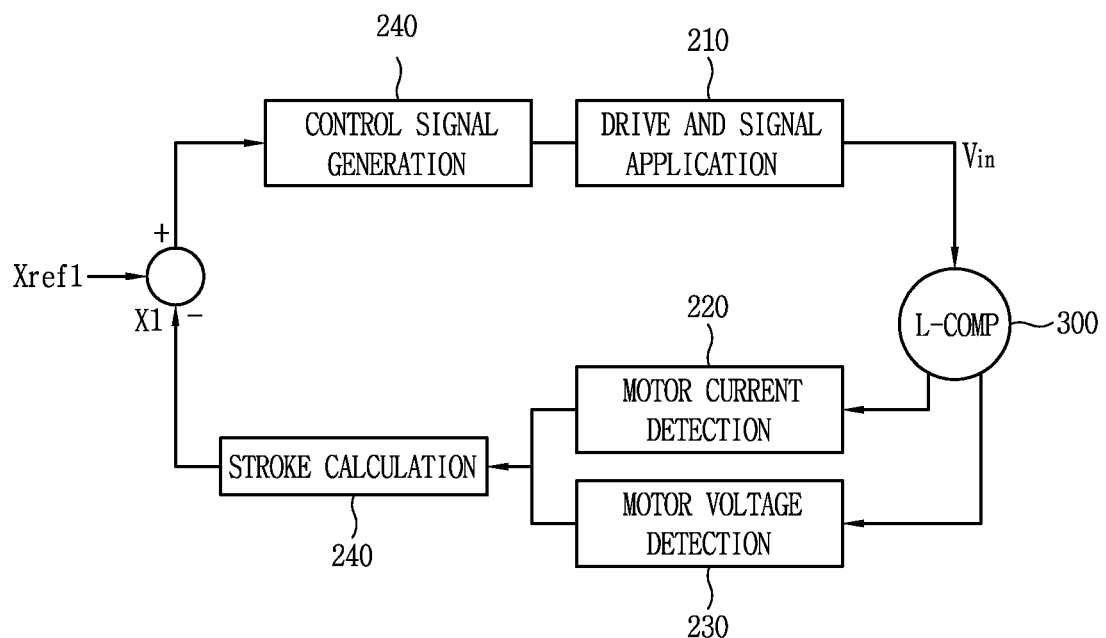
FIG. 2 is a block diagram illustrating a control operation of a control apparatus of a linear compressor according to an embodiment of the present disclosure.

Detailed structure of the control apparatus 200 for a linear compressor will be described with reference to FIG. 2. FIG. 2 is a block diagram illustrating a control operation of a control apparatus of a linear compressor according to an embodiment of the present disclosure.

The drive unit 210 may include circuitry components to perform drive and signal application and may apply a drive signal (Vin) to a linear compressor 300 to drive the linear compressor 300 or a component thereof, such as a motor of the linear compressor 300. For example, the drive unit 210 may generate a motor drive signal based on a control signal outputted from the controller 240. Further, the drive unit 210 may include circuitry to apply the generated motor drive signal to the linear compressor 300 to drive the linear compressor 300. Here, the drive signal may be in the form of an alternating voltage or an alternating current. The drive unit 210 may include an inverter or a triode for alternating current (triac) to control the drive signal.

The controller 240 may output a control signal to the drive unit 210. For example, the controller 240 may output the control signal to the drive unit 210 in the form of a voltage control signal that is generated using PWM (pulse width modulation).

In one example, the controller 240 may calculate a stroke using an inductance of a motor of the linear compressor 300, and the controller 240 may generate a control signal based on the calculated stroke.

As further described below, the drive unit 210 may apply a test signal to the linear compressor 300 under the control of the controller 240. The test signal may be a direct current (DC) voltage.

The current detecting unit 220 may perform motor current detection and detect a motor current of the linear compressor 300. For example, when a voltage is applied to the motor of the linear compressor 300 upon application of a drive signal or a test signal, the current detecting unit 220 may detect a motor current of the linear compressor 300. Similarly, when the voltage is applied to the motor of the linear compressor 300 upon application of the drive signal or the test signal, the voltage detecting unit 230 may detect a motor voltage of the linear compressor 300.

The controller 240 may determine several inductances that may change according to the size of a motor current, a motor current change, and a motor voltage during an application of the test signal. For example, the controller 240 may determine multiple several inductances corresponding, respectively, to multiple motor currents using a time differential of the motor voltage and multiple motor currents that are acquired during application of a DC current or other test signal.

The DC voltage may be applied for a predetermined time, and the predetermined time may correspond to a time that a stroke of the linear compressor 300 is not changed by application of a DC current. For example, the test signal may be a pulse signal in which a DC voltage is applied at a regular period. In this example, the controller 240 may acquire multiple inductances corresponding, respectively, to multiple motor currents, using a change of a motor voltage and multiple currents measured during the regular period. A gap between the pulses, which are applied at the regular period, may correspond to a time that a stroke of the linear compressor 300 is not changed by a pulse signal in which a DC voltage is applied at the regular period.

The values of the multiple inductances corresponding, respectively, to multiple motor currents may be stored in the storage unit 250. The controller 240 can later access the storage unit 250 to acquire the inductance values.

The controller 240 may determine a second motor current while the linear compressor 300 is driven upon application of a drive signal. Further, the controller 240 may determine an inductance value corresponding to the second motor current among the plural inductances stored in the storage unit 250. In this instance, the controller 240 may determine a stroke value of a motor based on an inductance corresponding to the second motor current.

For example, the controller 240 may calculate an estimation value of a stroke using at least one of a motor current, a motor voltage, or a motor parameter. Here, the motor parameter may include at least one of a resistance component of a motor, an inductance component of a motor, or a reverse electromotive force constant.

For instance, the controller 240 may output a control signal based on a stroke value of a motor. In this example, the controller 240 may compare the operated stroke estimate value and a stroke command value, and generate a control signal based on the comparison result. Further, the controller 240 may output the generated control signal to the drive unit 210, as previously described.

For example, when the estimate value of a motor is larger than the stroke command value of a motor, the controller 240 may output a control signal for decreasing a motor application voltage to the drive unit 210. Further, when the estimate value of a motor is smaller than the stroke command value of a motor, the controller 240 may output a control signal for increasing a motor application voltage to the drive unit 210. The drive unit 210 may then apply a drive signal to the linear compressor 300 based on a control signal received from the controller 240.

In certain implementations, the controller 240 may control the operation of the control apparatus 200 for the linear compressor 300, as whole. Similarly, each component of the control apparatus 200 for the linear compressor 300 may be separately operated under the control of the controller 240. It should be appreciated, however, that the specific components of the control apparatus 200 for the linear compressor 300, as shown in FIGS. 1 and 2, are not essential, and the controller apparatus 200 may be implemented with more or less components than shown in these figures.

Figure 3:
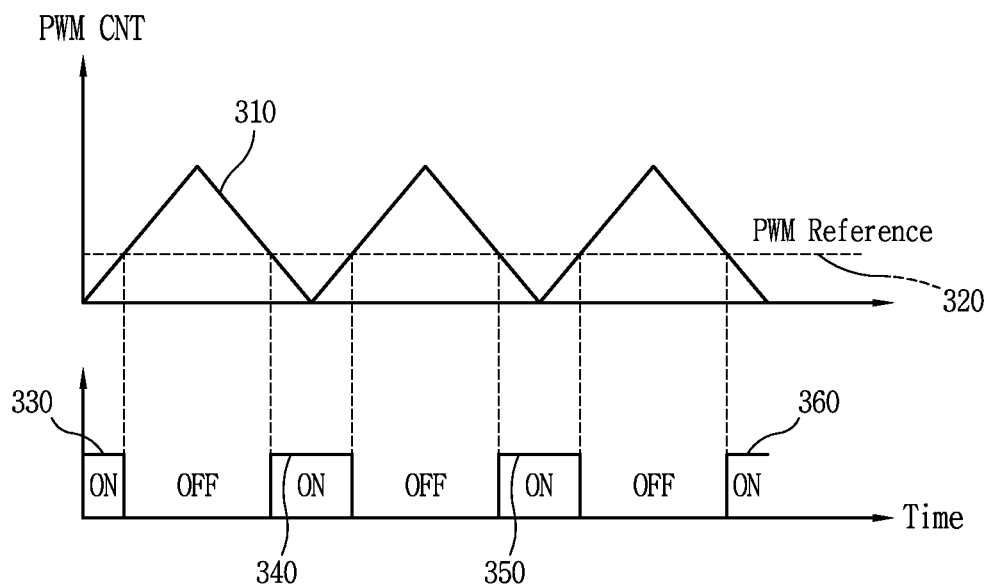
FIG. 3 is a diagram for explaining a control signal and a drive signal according to an embodiment of the present disclosure.

FIG. 3 is a diagram illustrating examples of a control signal and a drive signal according to an embodiment of the present disclosure. For example, the controller 240 may output a control signal to the drive unit 210 in the form of a voltage control signal that is generated as a PWM (Pulse Width Modulation) signal.

In one example, two signals may be used to modulate a pulse width of a control signal. One signal may be a carrier signal 310, and the other signal may be a reference signal 320. For instance, the carrier signal 310 may use a triangle wave and the reference signal 320 may be used as a command value to control the drive unit 210.

According to one embodiment, the reference signal 320 may be a table voltage which is outputted at a constant frequency based on a sine table. For example, the reference signal may have a sine wave at a periodic dispersion time field. Thus, the controller 240 may control the linear compressor 200 by controlling a size, shape and DC mean value (or Dc offset value) of the reference signal.

Accordingly, the controller 240 may generate a control signal that controls a switching element to be turned on when the reference signal is larger than the carrier signal and the switching element to be turned off when the reference signal is smaller than the carrier signal, and output the control signal to the drive unit 210.

Meanwhile, the drive unit 210 may apply control signals 330, 340, 350 and 360 to the linear compressor 300 based on the control signal. In this example, the substantially constant reference signal 320 may be repeatedly larger than or smaller than the varying carrier signal 310. Thus, the drive signals 330, 340, 350 and 360 may also be in the form of a pulse to which a voltage is repeatedly supplied or interrupted based on the respective values of the carrier signal 310 and the reference signal 320. In this example, the drive signals 330, 340, 350 and 360 may be outputted when the carrier signal 310 is less than the reference signal 320, and the width or the interval of the drive signal may vary depending on the control signals 330, 340, 350 and 360.

The motor current of the linear compressor 300 may be varied depending on an on/off of a pulse of the drive signal. For example, when a voltage is applied to the linear compressor 300 by a turn-on of a pulse of the drive signal, a motor current of the linear compressor 300 may be increased. Conversely, when a voltage is applied to the linear compressor 300 by a turn-off of a pulse of the drive signal, a motor current of the linear compressor 300 may be decreased. Accordingly, FIG. 3 shows how signals related to generating a control signal signals 330, 340, 350 and 360 for applying a drive signal to the linear compressor 300.

Figure 4:
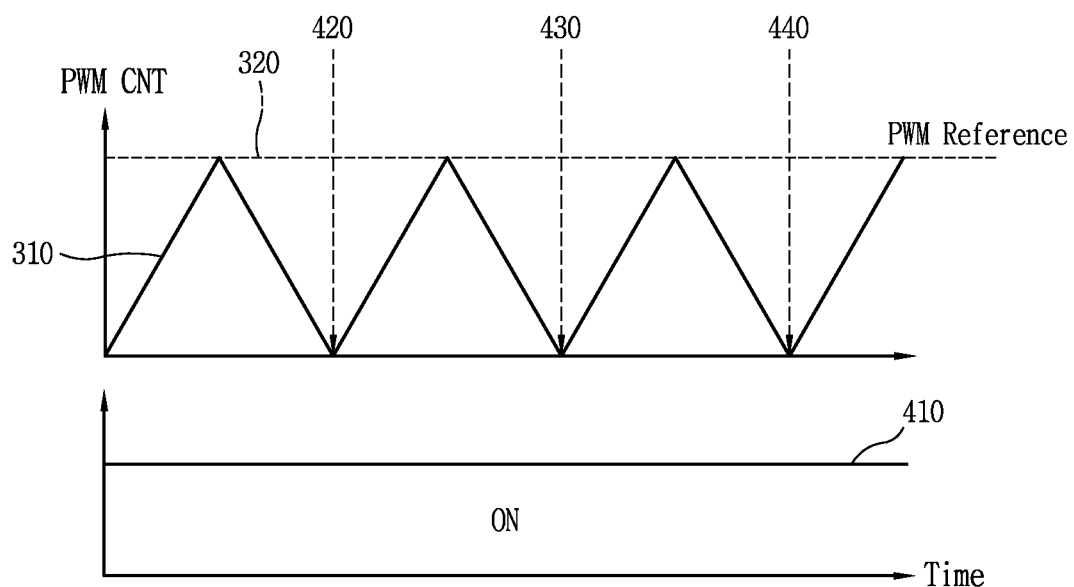
FIG. 4 is a diagram for explaining a test signal according to an embodiment of the present disclosure.

FIG. 4 depicts an example of a test signal according to an embodiment of the present disclosure. A process for generating a control signal to apply a test signal to the linear compressor 300 will be described with reference to FIG. 4.

As previously described, the controller 240 may output a control signal to the drive unit 210 in the form of a voltage control signal generated in the type of a PWM (Pulse Width Modulation). When the reference signal 320 is increased, a portion where the reference signal 320 is larger than the carrier signal 310 is increased so that a turn-on time of a switching element is increased, thereby increasing the size of a voltage or current applied to the linear compressor 300.

As shown in FIG. 4, the reference signal 320 may be fixed to a value more than a maximum value of the carrier signal 310 in the process of generating a test signal. In this instance, the controller 240 may control the drive unit 210 by generating a control signal that a turn-on (activation) of a switching element is maintained.

As previously described, the drive unit 210 may apply a test signal 410 to the linear compressor 300 based on a control signal. In this instance, since the reference signal 320 is larger than the carrier signal 310, the test signal 410 may be in the form of a DC voltage, as shown in FIG. 4.

As the relatively high and constant test signal 410 is applied to the linear compressor 300, a motor current and motor voltage of the linear compressor 300 may be increased. The current detecting unit 220 may detect a motor current applied to a motor of the linear compressor 300 according to a load of the linear compressor 300 or a load of a refrigeration system (for instance, a refrigerator) to which the linear compressor is applied. As used herein, the "motor current" may mean a current applied to a motor of the linear compressor 300 based on a test signal inputted to the linear compressor 300. The motor current may be detected by a current sensor, a current detector, and the like associated with the current detecting unit 220.

Further, the voltage detecting unit 230 may detect a motor voltage applied to both ends of a motor of the linear compressor 300 according to a load of the linear compressor 300 or a load of a refrigeration system (for instance, a refrigerator) to which the linear compressor is applied. As used herein, the "motor voltage" may mean a voltage applied to a motor of the linear compressor 300 by a test signal inputted to the linear compressor 300. The motor voltage may be detected by a voltage sensor, a voltage detector, and the like associated with the voltage detecting unit 230.

Meanwhile, an electric equation representing the electric characteristics of a motor may be expressed as follows:

$$V = Ri + L\frac{di}{dt} + \alpha\frac{dx}{dt} \qquad \text{[Equation 1]}$$

The motor constant may include a resistance component of a motor, an inductance component of a motor, and a reverse electromotive force constant of a motor. Meanwhile, the storage unit 250 of the control apparatus for a linear compressor 200 may store the motor constant.

In equation 1, R may be the resistance component of a motor and may be a constant representing the resistance characteristics of a motor. Furthermore, L may be the inductance component of a motor and may be a constant representing the inductance component of a motor. Furthermore, α may be the reverse electromotive force constant and may be a constant representing a reverse electromotive force characteristics of a motor. Further, V may be a motor voltage, i may be a motor current, di/dt may be a time differential of the motor current, and dx/dt may be a stroke time differential of a motor. R, L, α may be calculated by substituting the motor current and the motor voltage to Equation 1.

Meanwhile, the controller 240 may acquire plural inductances which are varied by a size of a motor current based on the change of the motor current and motor voltage acquired by an application of the test signal. For example, the motor current and motor voltage of the linear compressor 300 may be calculated while the test signal is applied. The controller 240 may apply the test signal for a preset (or prescribed) time, and the preset time may correspond to time period in which a piston of the linear compressor 300 is not move by a DC voltage.

The preset time may be the time that the stroke of a motor is not changed by a DC voltage input to the linear compressor 300. For example, the controller 240 may apply a DC voltage to the linear compressor 300 for a preset time as a test signal 410. When a DC voltage is applied, a motor current may be gradually increased, and a piston may move after a predetermined time. However, the controller 240 may control a piston of the linear compressor 300 not to be moved through a test signal is applied by applying a Dc voltage until the time that the stroke is changed.

As used herein, the phrase that the stroke is not "changed" is intended to be used broadly and to include both that the stroke is never varied, but also that the stroke is changed by a small amount that is less than a predetermined, threshold amount such that this small amount of change may be ignored. When the stroke is not changed or, as previously described, the stroke changes is sufficiently small as to be ignored, a reverse electromotive force generated by a movement of a motor may be substantially zero (0) and may be a small that the reverse electromotive force α may be ignored.

Since the reverse electromotive force α may be relatively small (to have a value of approximately 0) and can be ignored, Equation 1 can be simplified into an electric equation representing the electric characteristics of a motor, as follows, into Equation 2.

$$V = Ri + L\frac{di}{dt} \qquad \text{[Equation 2]}$$

Equation 2 may be rearranged to express the inductance (L) of a motor during application of a test signal as follows in Equation 3.

$$L(V - Ri)\frac{dt}{di} \qquad \text{[Equation 3]}$$

Figure 5:
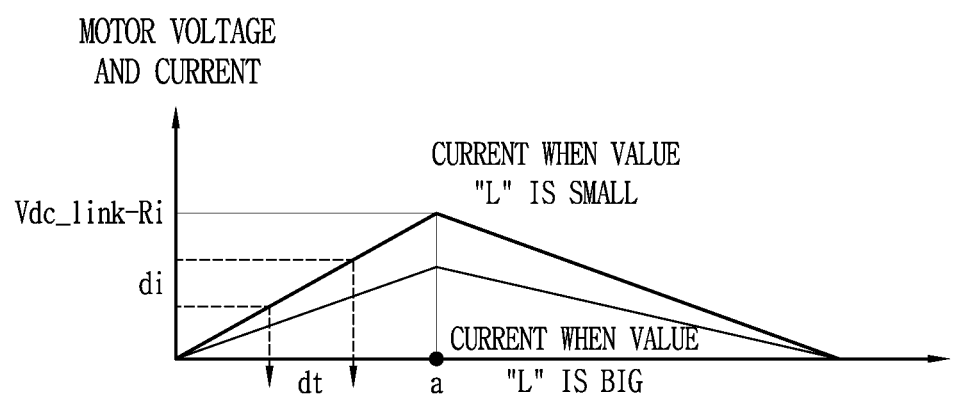
FIG. 5 is a graph illustrating Equation 3.

FIG. 5 is a graph illustrating examples of values generated using Equation 3. Referring to Equation 3 and FIG. 5, as a test signal is applied, the current applied to a motor of the linear compressor 300 is increased, and the amount of the change of current (corresponding to a time differential of current) may also be changed. Thus, as the test signal is applied, the inductance component (L) of a motor may also be changed.

In this example, the controller 240 may acquire multiple inductances corresponding, respectively, to multiple motor currents using the amount of change of a motor voltage and plural motor currents acquired during application of the test signal. For example, the controller 240 may measure a motor current while a DC voltage is applied.

Further, the controller 240 may measure a motor current several times while a DC voltage is applied, and may acquire a time differential value of a motor current at a time point that the motor current is measured. In this instance, the controller 240 may measure plural inductance values corresponding, respectively, to motor currents measured plural times. For instance, the controller 240 may acquire information that when a motor current is 1 A, an inductance of a motor is 280 mH, and that when a motor current is 2 A, an inductance of a motor is 210 mH.

In this instance, the controller 240 may store inductance values corresponding, respectively, to motor currents measured multiple times to the storage unit 250. For instance, the controller 240 may store L1 which is an inductance value of a motor when an amplitude of a motor current is Im1, L2 which is an inductance value of a motor when an amplitude of a motor current is Im2, and L3 which is an inductance value of a motor when an amplitude of a motor current is Im3 to the storage unit 250.

Referring again to FIG. 4, the controller 240 may periodically measure a motor current and an amount of change of the motor current. In FIG. 4, the time points 420, 430, and 440 may be a time point that the carrier signal 310 has a minimum value (for instance, 0). In another example, the time points 420, 430, and 440 may correspond to times associated with a maximum difference between the carrier signal 310 and the reference signal 320. Consequently, the controller 240 may measure a motor current and the change of motor current at a period in correspondence with the period of the carrier signal.

Figure 6:
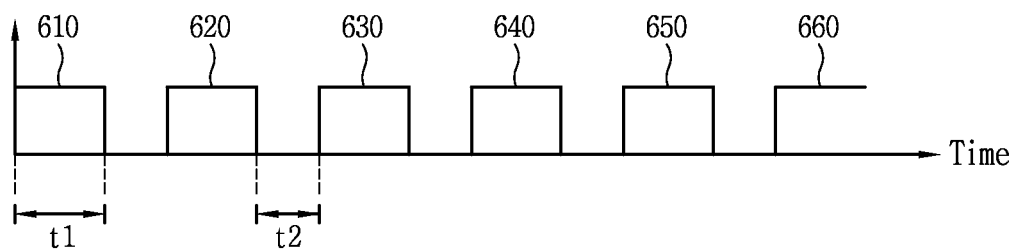
FIG. 6 is a diagram for explaining a method for enhancing a correctness of a motor current and an inductance value corresponding to the motor current by applying a DC voltage at a predetermined interval according to an embodiment of the present disclosure.

FIG. 6 illustrates applying a DC voltage at a predetermined interval according to an embodiment of the present disclosure. The test signal may be a pulse signal to which a DC voltage is applied at a regular period. For instance, the test signal may be a signal in which a first pulse 610, a second pulse 620, a third pulse 630, a fourth pulse 640, a fifth pulse 650 and a sixth pulse 660 are periodically presented by applying a DC voltage is applied at a regular period.

Here, the DC voltage may be periodically applied. For example, the time (t1) during which a pulse is applied may be substantially identical among the pulses 610, 620, 630, 640, 650 and 660 or others pulses. In this example, the time (t1) that a DC voltage is applied may correspond to time in which a stroke of the linear compressor is not changed by a DC voltage, as described above. Furthermore, a time interval (t2) between pulses applied at a regular period may also be substantially identical among plural pulses 610, 620, 630, 640, 650 and 660 or other pulses.

Meanwhile, the controller 240 may calculate a motor voltage, plural motor currents and the change of plural motor currents (corresponding to a time differential of a motor current) at a predetermined period that a DC voltage is applied. For instance, the controller 240 may acquire plural motor currents Im1-1, Im2-1, Im3-1, Im4-1, Im5-1 and Im6-1 and corresponding motor inductances L1-1, L2-1, L3-1, L4-1, L5-1 and L6-1 while the first pulse 610 is applied.

Further, the controller 240 may acquire plural motor currents Im1-2, Im2-2, Im3-2, Im4-2, Im5-2 and Im6-2 and corresponding motor inductances L1-2, L2-2, L3-2, L4-2, L5-2 and L6-2 while the second pulse 620 is applied. Such a process may be repeated up to the sixth pulse 660.

Meanwhile, the controller 240 may acquire multiple inductances corresponding, respectively, to multiple motor currents using a change of a motor voltage and multiple motor currents measured at times separated by a predetermined period. For example, the controller 240 may average plural inductances acquired at a predetermined period and corresponding to an identical current. For instance, the controller 240 may acquire an inductance L1 corresponding to a first current Im1 by averaging plural inductances L1-1, L1-2, L1-3, L1-4, L1-5 and L1-6 which are acquired at a predetermined period and correspond to the first current Im1.

Further, the controller 240 may acquire an inductance L2 corresponding to a second current Im2 by averaging plural inductances L2-1, L2-2, L2-3, L2-4, L2-5 and L2-6 which are acquired at a predetermined period and correspond to the second current Im2. Through repeatedly executing the above processes, the controller 240 may acquire plural inductances L1, L2, L3, L4, L5 and L6 corresponding, respectively, to plural motor currents Im1, Im2, Im3, Im4, Im5 and Im6.

Further, the controller 240 may acquire plural inductances L1, L2, L3, L4, L5 and L6 by averaging the remainder of the plural inductance values periodically acquired after excluding inductance values having an error therefrom. For example, the controller 240 may acquire plural inductances L1, L2, L3, L4, L5 and L6 corresponding, respectively, to plural motor currents Im1, Im2, Im3, Im4, Im5 and Im6, by averaging plural inductances within a specific range of size among plural inductances corresponding to an identical current.

Meanwhile, the time interval t2 between the pulses applied at a predetermined period may correspond to the time that a stroke is not changed by a pulse signal to which a DC voltage is applied at a predetermined period. For example, when a DC voltage is applied, a motor current may be gradually increased, and a stroke me be changed as a predetermined time passes. However, the controller 240 may control a stroke of the linear compressor 300 to not change though the test signal is applied, by applying a DC voltage until the time point that the stroke is changed. For example, the controller 240 may apply the test signal for a relative short time such that the test signal is ceased before the test signal would cause a change in the piston stroke.

In one example, a motor current is decreased until a next voltage is applied after a Dc voltage is applied, and when the next DC voltage is applied, the motor current may be increased again. However, the controller 240 may decrease a motor current by controlling a time interval between the pulses so that a stroke is not changed by the next DC voltage. For example, the interval between pulses applied at a predetermined period may be an interval that a motor current increased by a DC voltage becomes substantially zero or is below a preset value. In this example, the controller 240 may control the time interval between pulses in order to prevent change of a stroke by an accumulation of a motor current while pulse signals are repeatedly applied.

It should be appreciated that the phrase that a stroke is "not changed" is intended to be interpreted expansively to include both a case in which a stroke is never altered changed and another case in which a stroke changes by less than a predetermined, threshold value such that the change in the stroke can be effectively ignored as not materially effecting the linear compressor 300.

Meanwhile, the controller 240 may store plural inductances corresponding, respectively, to plural motor currents to the storage unit 250. Furthermore, when a linear compressor is driven by application of a drive signal, the controller 240 may acquire a second motor current of the linear compressor.

Furthermore, the controller 240 may acquire an inductance corresponding to the second motor current among plural inductances stored in the storage unit 250. In this instance, the controller 240 may calculate a stroke estimate value using at least one of a second motor current, a second motor voltage and a motor constant. As previously described, the motor constant may include, for example, a resistance component of a motor, an inductance component of a motor, and a reverse electromotive force constant of a motor. In one example, the reverse electromotive force constant of a motor may be an inductance corresponding to a second motor current.

Meanwhile, the controller 240 may compare a stroke estimate value of a motor with a stroke command value of a motor, and generate a control signal based on the comparison result. Such a process may be repeatedly executed while a drive signal is applied and a motor current is changed. For instance, when a third motor current is detected after detection of a second motor current, the controller 240 may calculate a stroke estimate value using at least one of the third motor current, a third motor voltage, and a motor constant. Here, the motor constant may include an inductance component of a motor, and the inductance component of a motor may be an inductance corresponding to a third motor current stored in the storage unit 250.

Figure 7:
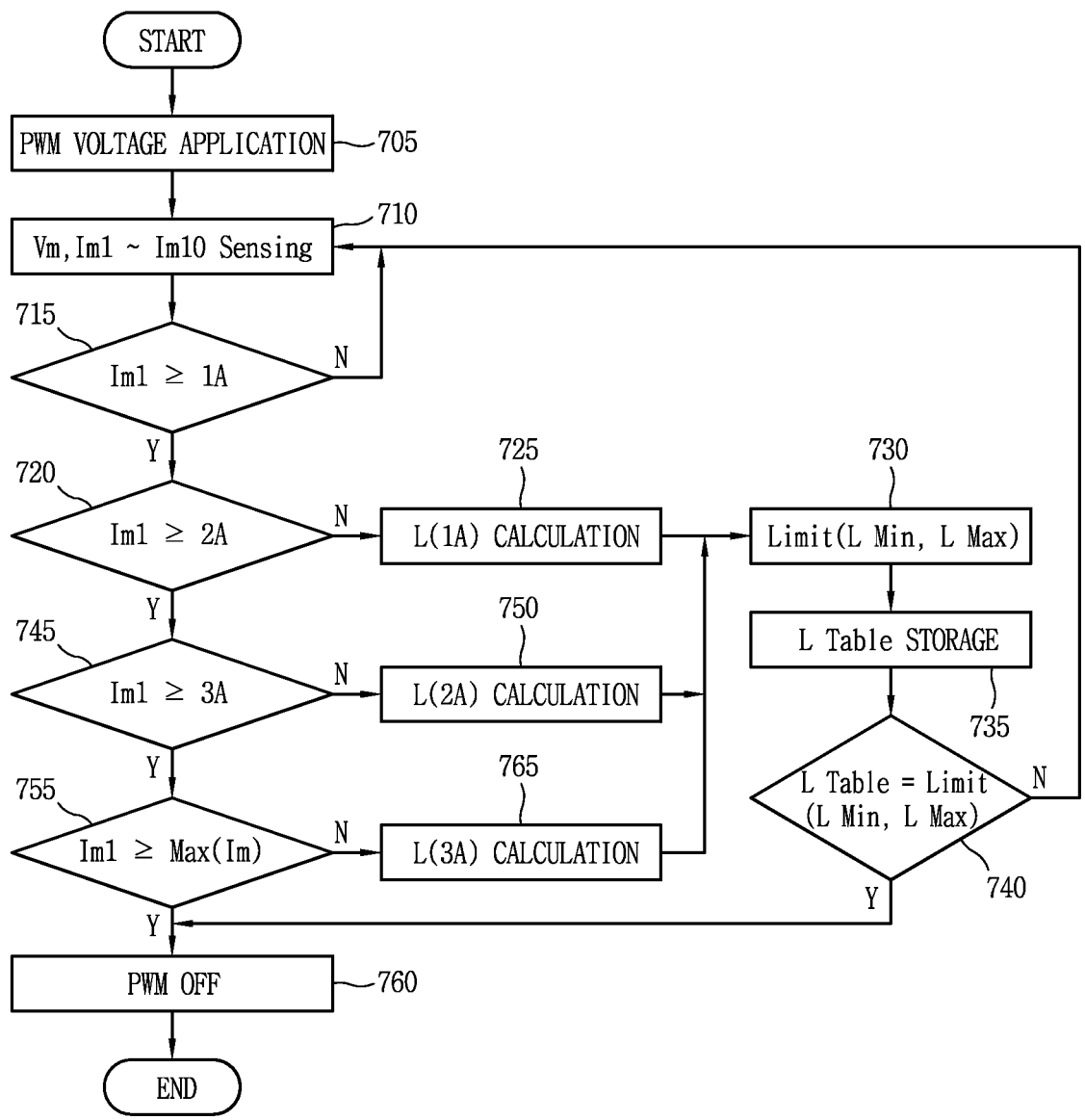
FIG. 7 is a diagram illustrating an operation of the control apparatus for a linear compressor according to an embodiment of the present disclosure.

FIG. 7 is a diagram illustrating an operation of the control apparatus for a linear compressor according to an embodiment of the present disclosure. For example, The controller 240 may apply a test signal (S705). The controller 240 may measure a motor voltage Vm and plural motor currents Im1~Im10 while a DC voltage is applied (S710).

The controller 240 may determine whether the measured motor current Im1 is larger than a first value (for instance, 1 A or other first prescribed value) (S715). When the measured motor current value Im1 is smaller than the first value (for instance, 1 A), the controller 240 may measure again a motor current and a motor voltage after returning to the step (S710).

Meanwhile, when the measured motor current value Im1 is larger than the first value (for instance, 1 A), the controller 240 may determine whether the measured motor current Im1 is larger than a second value (for instance, 2 A or other second prescribed value) (S720). When the measured motor current value Im1 is smaller than the second value (for instance, 2 A), the controller 240 may calculate a first inductance L(1 A) corresponding to the first value (for instance 1 A) of a motor current a motor current and a motor voltage after returning to the step (S725). Meanwhile, when the first inductance L(1 A) is calculated, the controller 240 may determine whether the calculated first inductance is within a predetermined range (S730).

When the calculated first inductance is within a predetermined range, the controller 240 may store a first inductance corresponding to the first value of a motor to an inductance (L) table (S735, S740). Meanwhile, when the calculated first inductance is not in a predetermined range, the controller 240 may measure again the motor current and motor voltage after returning to the step (S710).

Meanwhile, when the measured motor current is larger than the second value (for instance, 2 A) in the step (S720), the controller 240 may determine whether the calculated motor current is larger than a third value (for instance, 3 A or other third prescribed value) (S730). When the calculated motor current is smaller than the third value (for instance, 3 A), the controller 240 may calculate a second inductance (L(2 A)) corresponding to the second value (for instance, 2 A) of a motor current (S750). Next processes (S730, S735 and S740) may be repeated as in the first inductance (L(1 A)).

Meanwhile, when the measured motor current is larger than the third value (for instance, 3 A) in the step (S745), the controller 240 may determine whether the calculated motor current is larger than a fourth value (for instance, 4 A or other fourth prescribed value) (S755). When the calculated motor current is smaller than the fourth value (for instance, a maximum value of a motor current), the controller 240 may calculate a third inductance (L(3 A)) corresponding to the third value (for instance, 3 A) of a motor current (S765). Next processes (S730, S735 and S740) may be repeated as in the first inductance (L(1 A)).

The processes as above may be repeated at the plural motor currents Im1, Im2, Im3, Im4, Im5, Im6, Im7, Im8, Im9 and Im10. Thus, plural inductance (L) tables corresponding, respectively, to plural motor currents may be stored in the storage unit 250. Further, when the measured motor current is larger than the fourth value (for instance, a maximum value of a motor current), the controller 240 may stop application of a test signal (S760).

Meanwhile, the test signal may be a pulse signal to which a DC voltage is applied at a predetermined period. In this instance, the controller 240 may acquire plural inductances corresponding, respectively, to plural motor currents, using the change of a motor voltage and plural motor currents measured at a predetermined period. For example, the controller 240 may acquire multiple inductance values for a current of an identical size measured at a predetermined period. For instance, when a pulse voltage is applied ten times in total, the controller 240 may acquire ten inductance values for the motor current of 1 A. In this instance, the controller 240 may add and store an average value of plural inductance values for a current of a substantially identical size.

Meanwhile, the inductance value may be out of a preset range due to a sensing error in the inductance calculation process. In this instance, the controller 240 may add and store an average value of remaining inductance values from the inductances that are out of a preset range.

Figure 8:
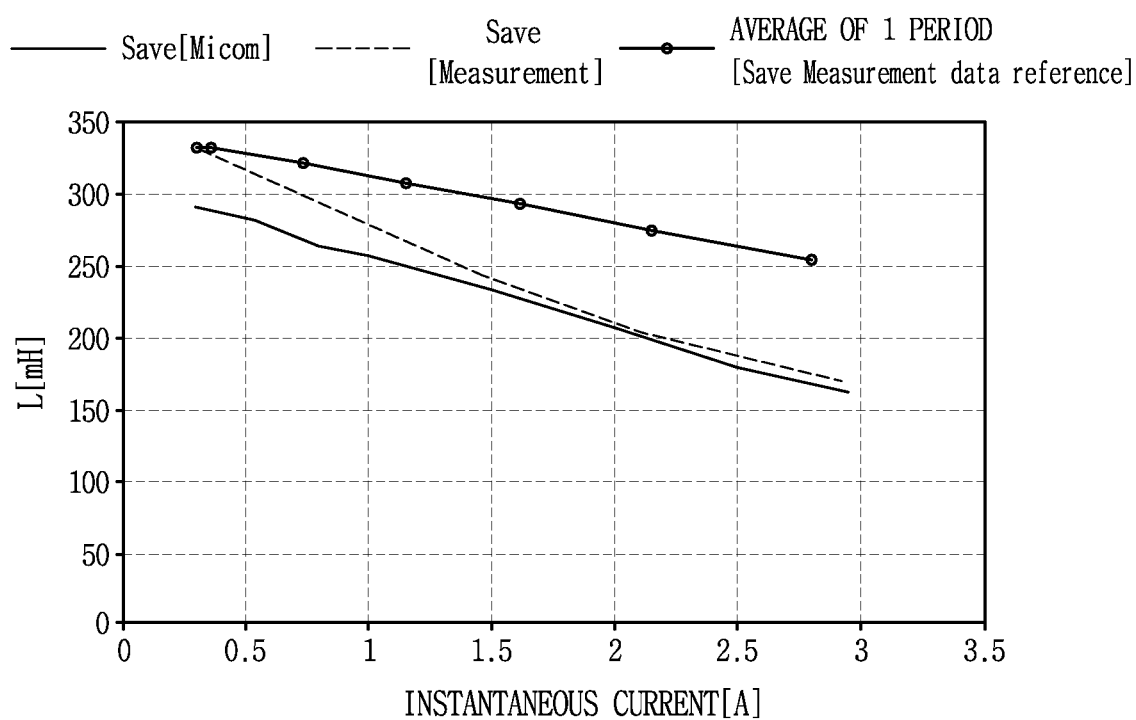
FIG. 8 is a diagram illustrating a test result on a relation between an electric current and an inductance according to an embodiment of the present disclosure.

FIG. 8 is a diagram illustrating a test result on a relationship between an electric current and an inductance, according to an embodiment of the present disclosure. As shown in FIG. 8, it can be noted that an inductance may change according to a change of a size of a motor current. That is, when a size of a motor current is increased, an inductance of a motor may be decreased.

Unlike the conventional art in which a stroke calculation is executed by setting an inductance value of a motor as a fixed representative value, the principles described herein enable an inductance change that may be estimated in real time, such that a calculation error that may occur in controlling a linear compressor can be reduced. Further, according to the present disclosure, a motor current and an inductance value corresponding thereto may be stored in a table, such that an inductance value of a motor may be promptly and easily estimated, even by a process of detecting a motor current during operation of a linear compressor.

Figure 9:
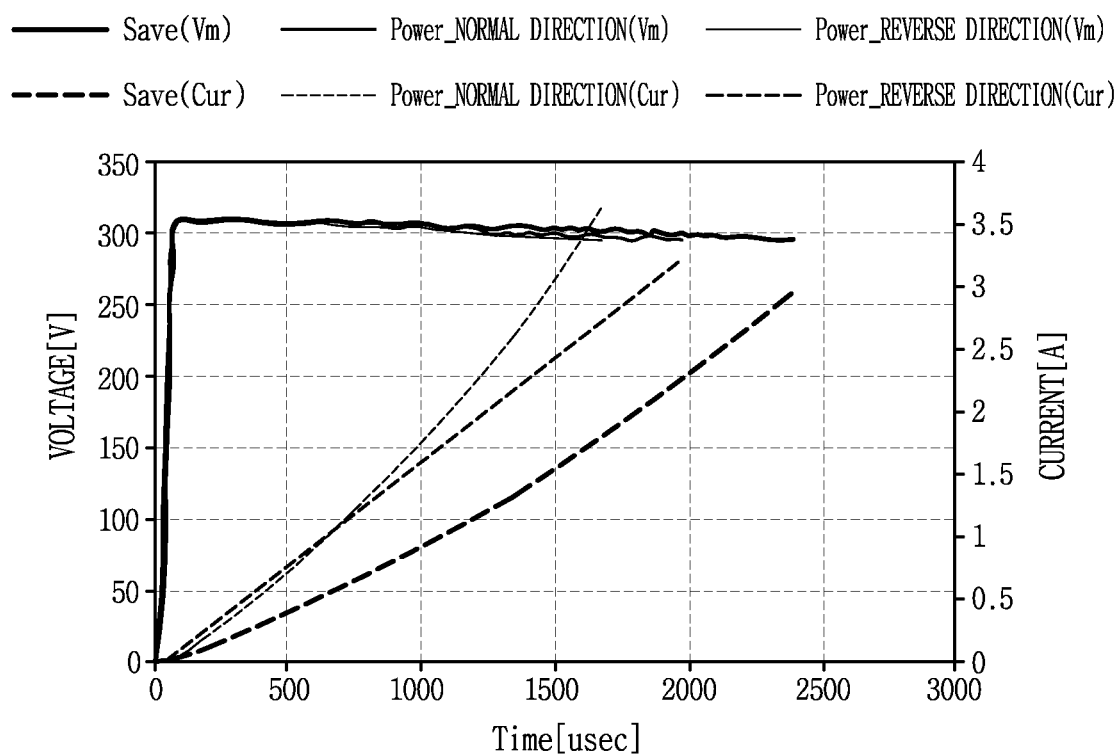
FIG. 9 is a diagram illustrating an experimental result on a motor current and a motor voltage measured during application of a test signal.

FIG. 9 is a diagram illustrating an experimental result on a motor current and a motor voltage measured during application of a test signal. As shown in FIG. 9, a motor current may be increased while a test signal is applied. Furthermore, a change amount of a motor current (e.g., a time differential of a motor current) may be increased as a test signal is applied.

Figure 10:
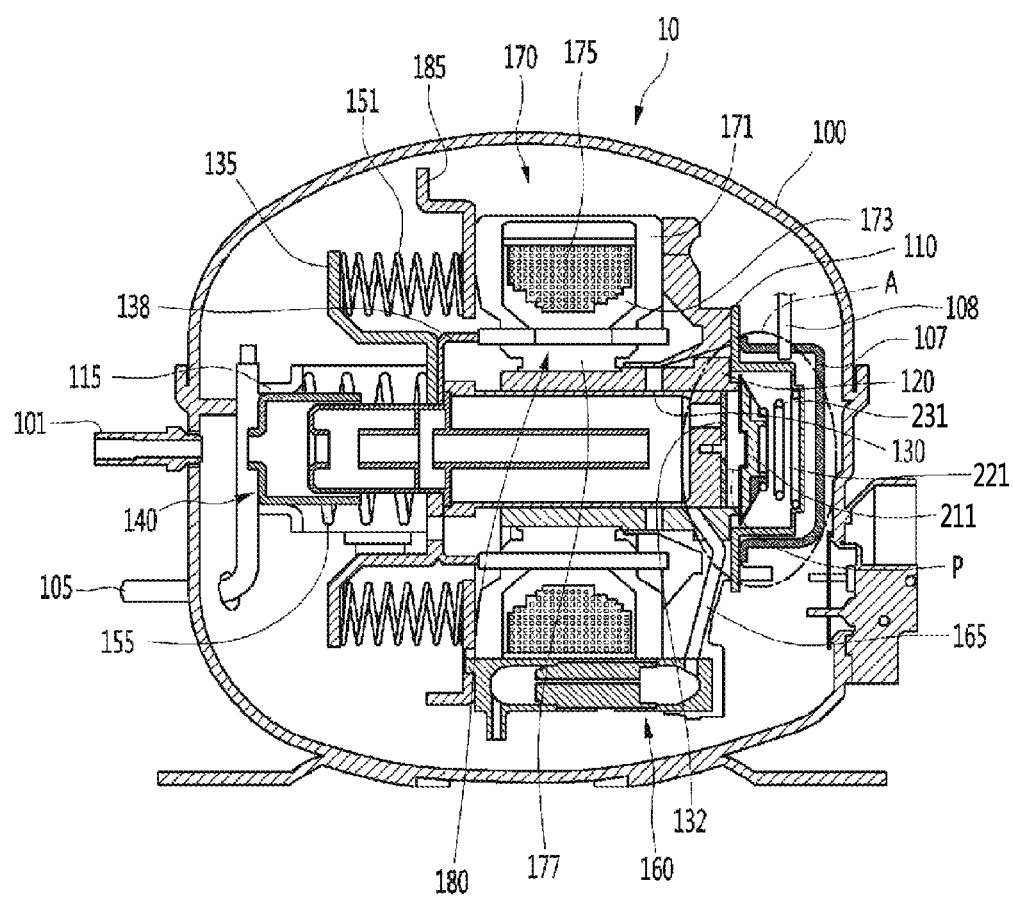
FIG. 10 is a cross-sectional view illustrating the inner structure of a compressor according to an embodiment of the present disclosure.

Meanwhile, an embodiment of a linear compressor to which a control apparatus 200 as described above is applied will be explained, but this is not intended to limit the scope of the disclosure and may also be applicable to the conventional linear compressor. FIG. 10 is a cross-sectional view illustrating the inner structure of an example of a compressor according to an embodiment of the present disclosure.

Referring to FIG. 10, the linear compressor 10 according to an embodiment of the present disclosure may include a shell 100, a cylinder 120 provided within the shell 100, a piston 130 configured to linearly move and reciprocated within the cylinder 120, and a motor assembly 170 configured to provide a drive force to the piston 130.

The shell 100 may include an upper shell and a lower shell coupled to each other. The shell 100 may include a suction part (or suction port) 101 in which refrigerant flows and an exhaust part (or exhaust port) 105 through which the refrigerant compressed within the cylinder 120 is discharged. The refrigerant sucked through the suction part 101 flows in the piston 130 through a suction muffler 140. In the course of passing through the suction muffler 140, noise may be decreased.

The cylinder 120 is provided with a compression space (P) in which refrigerant is compressed by the piston 130. And the piston 130 is provided with a suction hole 131a through which refrigerant flows into the compression space (P). A suction valve is provide at one side of the suction hole 131a which is configured to selectively open the suction hole 131a.

A discharge valve assembly configured to discharge refrigerant compressed at the compression chamber (P) is provided at one side of the compression chamber (P). That is, the compression chamber (P) may be understood as a space formed between one end of the piston 130 and the discharge valve assembly. The discharge valve assembly may include a discharge cover 221 configured to form a discharge space of refrigerant, a discharge valve 211 configured to be opened when a pressure within the compression chamber (P) is higher than a discharge pressure so that refrigerant may flow in the discharge space, and a valve spring 231 provided between the discharge valve 211 and the discharge cover 221 to provide an elastic force in an axial direction. As used herein, the "axial direction" may correspond to a direction that the piston 130 is reciprocated, that is, in the transverse direction in FIG. 10.

The suction valve 132 may be provided at one side of the compression space (P) and the discharge valve 211 may be provided at the other side of the compression space (P), that is, on an opponent side of the suction valve 132. When the pressure within the compression space (P) is lower than the discharge pressure and a suction pressure in the process of a reciprocation movement of the piston 130 within the cylinder 120, the suction valve 132 may be opened so that refrigerant is sucked into the compression space (P). Additionally, when the pressure within the compression space (P) is higher than the suction pressure, refrigerant within the compression space (P) may be compressed while the suction valve 132 is closed.

Meanwhile, when the pressure within the compression space (P) is higher than the discharge pressure, the valve spring 231 may be deformed to open the discharge valve 211, so that refrigerant may discharged from the compression space (P) to a discharge space through the discharge cover 221. In one example, the discharge cover 221 includes a resonance chamber for reducing a pulsation of the refrigerant which is discharged through the discharge valve 210, and may be provided with a refrigerant discharge hole (not shown) for discharging refrigerant.

The refrigerant within the discharge space may flow into a discharge muffler 107 through the discharge hole and, then, may flow into a loop pipe 108. The discharge muffler 107 may reduce a flow noise of the compressed refrigerant, and the loop pipe 108 guides the compressed refrigerant to the discharge part 105. The loop pipe 108 is coupled to the discharge muffler 107 and extended toward an inner space of the shell 100, and then coupled to the discharge part 105.

The linear compressor 10 further includes a frame 110. The frame 110 is configured to fix the cylinder 120 and may be formed integrally with the cylinder 120 or coupled by a separate coupling member. The discharge cover 221 and the discharge muffler 107 may be coupled to the frame 110.

The motor assembly 170 may include outer stators 171, 173 and 175 fixed to the frame 110 and provided to enclose the cylinder 120, an inner stator 177 provided within the outer stators 171, 173 and 175 with a space therebetween, and a permanent magnet 180 provided at a space between the outer stators 171, 173 and 175 and the inner stator 177.

The permanent magnet 180 may rectilinearly reciprocate by an electromagnetic force formed between the outer stators 171, 173 and 175 and the inner stator 177. The permanent magnet 180 may be configured as a single magnet having a single magnetic pole, or as multiple magnets having three magnetic poles.

The permanent magnet 180 may be coupled to the piston 130 by a connection member (or magnet connecter) 138. The connection member 138 may be extended from one end of the piston 130 to the permanent magnet 180. As the permanent magnet 180 rectilinearly moves, the piston 130 may rectilinearly reciprocate together with the permanent magnet 180 in an axial direction.

The outer stators 171, 173 and 175 may also be referred to herein as a stator core 171, a coil winding (or bobbin) 173, and a coil winding (or coil) 175. The coil 175 may be wound around in a circumferential direction of the bobbin 173. A cross section of the coil 175 may have a polygonal shape, such as a hexagonal shape. The stator core 171 is formed by stacking plural laminations in a circumferential direction, and may be provided to enclose the coil windings 173 and 175. When a current is applied to the motor assembly 170, the current flows through the coil 175 so that a flux is formed around the coil 175 by the current. The flux flows and forms a closed circuit along the outer stators 171, 173 and 175 and the inner stator 177.

The flux flowing through the outer stators 171, 173 and 175 and inner stator 177 and the flux of the permanent magnet 180 interwork with each other such that a force to move the permanent magnet 180 may be generated. A stator cover 185 is provided at one side of the outer stators 171, 173 and 175. Each of the outer stators 171, 173 and 175 may include one end that is supported by the frame 110, and another end that is supported by the stator cover 185.

The inner stator 177 may be fixed to an outer circumference of the cylinder 120. The inner stator 177 may be formed by stacking multiple laminations at an outer side of the cylinder 120 in a circumferential direction.

The linear compressor 10 may further include a supporter (or support frame) 135 that supports the piston 130 and a back cover 115 that extends from the piston 130 toward the suction part 101. The back cover 115 may be provided to cover at least part of the suction muffler 140.

The linear compressor 10 may further include springs 151 and 155, each having a natural vibration frequency that is controlled such that the piston 130 may resonate. The springs 151 and 155 include a first spring 151 supported between the supporter 135 and the stator cover 185, and a second spring 155 supported between the supporter 135 and the back cover 115. One or more of the first springs 151 may be provided at both sides of the cylinder 120 or the piston 130. One or more of the second spring 155 may be provided at a rear side of the cylinder 120 or the piston 130.

As used herein, the "front side" may be construed as a direction toward the discharge assembly 200 from the suction part 101, and the direction from the piston 130 toward the suction part 101 may be construed as the "rear side". Additionally, an "axial" direction may mean a direction that the piston 130 is reciprocated, and a "radius" direction may mean a direction vertical to the axial direction. Such definitions of the direction may be similarly applicable to the following explanations.

In an inner bottom surface of the shell 100, a predetermined amount of oil may be stored. At a lower portion of the shell 100, an oil supply apparatus (or oil pump) 160 may be provided to pump the oil. The oil pumping apparatus 160 may be operated by a vibration generated by a reciprocation movement of the piston 130 to pump the oil upwardly.

The linear compressor 10 further includes an oil supply pipe 165 that guides a flow of oil from the oil supply apparatus 160. The oil supply pipe 165 may be extended from the oil supply apparatus 160 to a space between the cylinder 120 and the piston 130. Oil pumped from the oil supply apparatus 160 may be supplied to the space between the cylinder 120 and the piston 130 through the oil supply pipe 165 to perform cooling and lubrication operations.

Meanwhile, embodiments of the control method and apparatus for a linear compressor as described in the description of the present disclosure may be effectively applicable to the control method and apparatus for a compressor. Further, embodiments of the control method and apparatus for a linear compressor as described in the description of the present disclosure may be effectively applicable, especially, to the control method and apparatus for controlling various types of linear compressors.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. It should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Therefore, an aspect of the detailed description is to provide a control apparatus for a linear compressor which can acquire an inductance value by sizes of an electric current. Another aspect of the detailed description is to provide a control apparatus for a linear compressor capable of reducing an error of an inductance operation by restraining a reverse electromagnetic force when acquiring an inductance value.

A still another aspect of the detailed description is to provide a control apparatus for a linear compressor capable of acquiring a correct inductance value by processing plural tests. The control apparatus for a linear compressor according to an embodiment of the present disclosure may apply a test signal in the form of DC voltage to a motor, and acquire plural inductances that vary depending on a size of a motor current.

The control apparatus for a linear compressor according to an embodiment of the present disclosure may apply a test signal for the time that a stroke is not changed by a DC voltage. The control apparatus for a linear compressor according to an embodiment of the present disclosure may apply a pulse signal to which a DC voltage is applied at a predetermined interval, and acquire plural inductances corresponding, respectively, to plural motor currents by averaging the inductance values acquired at a predetermined interval.

The control apparatus for a linear compressor according to an embodiment of the present disclosure may store plural inductances corresponding, respectively, to plural motor currents, and perform an operation using an inductance corresponding to the measured motor current. According to the embodiments of the present disclosure, it is possible to acquire an inductance that is varied according to a size of a motor current while a linear compressor is driven. According to the embodiments of the present disclosure, it is possible to reduce an error of an inductance operation by controlling an application time of a test signal.

According to the embodiments of the present disclosure, it is possible to acquire a correct inductance value by an operation of an inductance using plural test results. According to the embodiments of the present disclosure, it is possible to quickly and easily estimate an inductance value of a motor even by a process for detecting a motor current during driving of a linear compressor.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control apparatus for a linear compressor, comprising:
    a drive circuit configured to apply a test signal to the linear compressor;

a current sensor configured to detect a motor current of the linear compressor;
a voltage sensor configured to detect a motor voltage of the linear compressor;
a memory; and
a controller that determines inductances based on a change of the motor current and the motor voltage which are detected as the test signal is applied,
wherein the test signal is a direct current (DC) voltage and is applied for a prescribed length of time,
wherein a stroke of a motor of the linear compressor is changed by less than a threshold amount by the test signal during the prescribed length of time,
wherein the controller is configured to acquire the inductances corresponding, respectively, to different values of the motor currents, using a time differential of the motor voltage and motor currents which are acquired while the DC voltage is applied,
wherein the test signal is a pulse signal to which the DC voltage is applied for predetermined periods, and the controller is further configured to the acquire inductances corresponding, respectively, to motor currents using a change of the motor voltage and motor currents which are measured at the predetermined periods, and
wherein the controller is further configured to:
store, in the memory, inductances values corresponding, respectively, to motor currents;
determine a second motor current of the linear compressor while the linear compressor is driven as a drive signal is applied;
determine a particular inductance value corresponding to the second motor current among the inductance values stored in the memory; and
determine a stroke value of the motor of the linear compressor based on the particular inductance value.

2. The control apparatus of claim 1, wherein the controller is further configured to acquire the inductances corresponding, respectively, to motor currents by averaging detected inductances which are acquired during the predetermined periods and correspond to a prescribed current.

3. The control apparatus of claim 2, wherein the controller is configured to acquire the inductances corresponding, respectively, to motor currents by averaging detected inductances within a prescribed range of sizes among the inductances corresponding to the prescribed current.

4. The control apparatus of claim 1, wherein a time interval between pulses applied at the predetermined periods corresponds to a length of time in which a stroke of the linear compressor is not changed by the pulse signal to which the DC voltage is applied at the predetermined periods.

5. A linear compressor comprising:
a motor;
a drive circuit configured to apply a test signal to the motor;
a current sensor configured to detect a motor current of the motor;
a voltage sensor configured to detect a motor voltage of the motor;
a memory; and
a controller configured to determine inductances that vary according to changes in the motor current,
wherein:
the controller determines the inductances based on changes of the motor current and the motor voltage which are detected as the test signal is applied,
the test signal is a direct current (DC) voltage and applied for a prescribed length of time,
a stroke of the motor is changed by less than a threshold amount by the test signal during the prescribed length of time,
the controller is configured to acquire the inductances corresponding, respectively, to different values of the motor currents, using a time differential of the motor voltage and motor currents which are acquired while the DC voltage is applied.

6. The linear compressor of claim 5, wherein the controller is further configured to acquire the inductances corresponding, respectively, to motor currents by averaging detected inductances which are acquired during the predetermined periods and correspond to a prescribed current.

7. The linear compressor of claim 6, wherein the controller is further configured to acquire the inductances corresponding, respectively, to motor currents by averaging detected inductances within a prescribed range of sizes among the inductances corresponding to the prescribed current.

8. The linear compressor of claim 5, wherein a time interval between pulses applied at the predetermined periods corresponds to a length of time in which a stroke of the linear compressor is not changed by the pulse signal to which the DC voltage is applied at the predetermined periods.

9. The linear compressor of claim of claim 5, wherein the controller is further configured to generate a control signal to the drive circuit based on the stroke value, and the drive circuit is further configured to modify the drive signal to the motor based on the control signal.

10. The linear compressor of claim of claim 9, wherein the controller is further configured to generate the control signal to cause the drive circuit to decrease a voltage of the drive signal when the stroke value is more than a stroke command value, and to increase the voltage of the drive signal when the stroke value is less than the stroke command value.

11. The linear compressor of claim 5, wherein the drive circuit is further configured to apply a carrier signal and a reference signal to the motor, and the reference signal has a value that is greater than a maximum value of the carrier signal when the test signal is applied.

12. A linear compressor comprising:
a motor;
a drive circuit configured to apply a test signal to the motor;
a current sensor configured to detect a motor current of the motor;
a voltage sensor configured to detect a motor voltage of the motor; and
a controller configured to determine inductances that vary according to changes in the motor current,
wherein:
the controller determines the inductances based on changes of the motor current and the motor voltage which are detected as the test signal is applied,
the test signal is applied for a prescribed length of time,
a stroke of the motor is changed by less than a threshold amount by the test signal during the prescribed length of time, and
the drive circuit is further configured to apply a carrier signal and a reference signal to the motor, and the reference signal has a value that is greater than a maximum value of the carrier signal when the test signal is applied.

* * * * *